Oct. 20, 1931.  A. M. PURCHIO  1,828,339
ANTIGLARE SHIELD FOR WINDSHIELDS OR THE LIKE
Filed Dec. 7, 1929
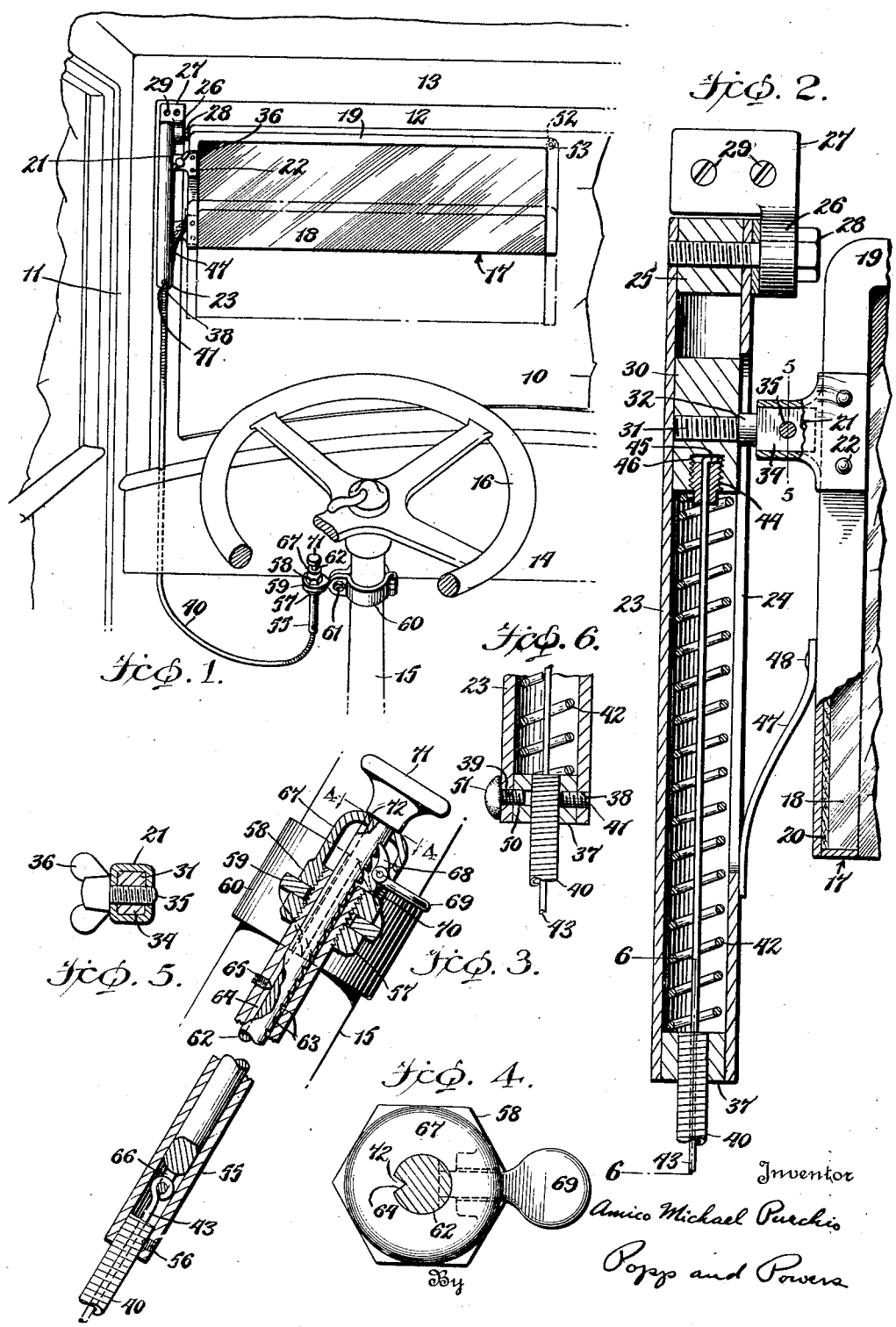

Patented Oct. 20, 1931

1,828,339

UNITED STATES PATENT OFFICE

AMICO MICHAEL PURCHIO, OF BUFFALO, NEW YORK

ANTIGLARE SHIELD FOR WINDSHIELDS OR THE LIKE

Application filed December 7, 1929. Serial No. 412,299.

This invention relates to an anti-glare shield for windshields or the like and more particularly to such a shield which is made of colored glass or other light absorbing transparent materials which is adapted to be adjustably mounted inside of a windshield of an automobile so that it can be moved to cut off the glare from the headlights of approaching cars or from a rising or setting sun into which the automobile may be traveling. By this means the bright glaring light which frequently blinds the driver of an automobile and creates the liability of serious accidents is eliminated. Such a shield is, however, also capable of use in places other than in connection with the windshield of an automobile.

The principal object of this invention is to provide such an anti-glare shield which is mounted adjacent the windshield of an automobile and which is readily vertically adjustable along the plane of the windshield so that the driver can conveniently move it to the necessary position to shield his eyes from the glaring light regardless of where the same originates.

Another object is to provide such an anti-glare shield which is conveniently adjusted from a point remote from the shield and within convenient reach of the driver so as to avoid the necessity of awkward movements and enable him to adjust the shield quickly if the necessity arises.

Another object is to provide convenient and quickly operable means for moving the shield to any desired position and retaining the shield in such adjusted position.

A further purpose is to provide such a shield which is so mounted that it can be readily swung away from the windshield and thereby enable the inside of the windshield to be easily cleaned.

Another aim is to provide such an anti-glare shield in which buffers are provided to prevent contact between the anti-glare shield and the windshield and thereby avoid scratching of the windshield or injury to the antiglare shield.

A still further object is to provide such an anti-glare shield which can be mounted either at the right or left side of the windshield, or both, thereby to provide an anti-glare shield both for the driver and the passenger seated next to him.

Other objects are to provide such an adjustable anti-glare shield which is inexpensive to form and assemble and install, which is reliably supported and not liable to get out of order through severe and constant use or under the vibration to which it is subjected, which is composed of few parts which are not liable to get out of order or require attention, and which is attractive in appearance and forms an attractive addition to the automobile accessories.

In the accompanying drawings:

Fig. 1 is a perspective view of the interior of an automobile showing my anti-glare shield applied thereto and showing the control means carried on the steering post.

Fig. 2 is a vertical longitudinal section through the supporting and guiding means for the shield, a part of the shield being broken away to disclose its construction.

Fig. 3 is a vertical section through the controlling means for the anti-glare shield, showing the same applied to the steering post of an automobile.

Fig. 4 is a section taken on line 4—4, Fig. 3.
Fig. 5 is a section taken on line 5—5, Fig. 2.
Fig. 6 is a section taken on line 6—6, Fig. 2.

Similar reference numerals refer to similar parts in each of the views.

In its general organization this invention comprises a longitudinal slotted tube which is pivotally mounted on one end on a bracket carried by the windshield frame or head bar of the automobile and carries a sliding block. In this block is screwed a screw having a square head to which the upper part of the anti-glare shield is attached and also secured to this block is a wire which extends through the end of the tube and a flexible cable and upon being drawn downwardly moves the block against the resistance of a spring which normally holds the anti-glare shield in an elevated position. The other end of this wire is connected to a ratchet member and hand piece which can be mounted at any convenient place for the driver of the car and is manipulated to draw the wire downwardly and thereby lower the shield and to release the wire and permit the spring to return the shield to an elevated position. The invention includes other structural details as will more fully hereinafter appear.

The anti-glare shield is shown as mounted adjacent the windshield 10 of an enclosed car, this car having the usual windshield posts 11, windshield frame 12, head bar 13, dash 14 and steering post 15 carrying the steering wheel 16.

The anti-glare shield 17 consists of a pane 18 surrounded at three of its edges by a frame 19. The pane 18 can be of any suitable light-absorbing, transparent material such as colored glass, coated glass or glass substitute and the frame 19 is preferably of channel form in cross section, the pane 18 being received within the channel. In order to insure against breakage of the pane 18 a split rubber tube 20 is fitted about the edges of the pane 18 and is fitted into the channel of the frame 19 so as to form a channel-shaped resilient cushion for the glass within the frame. At one side and near its upper end a socket 21 extends laterally outward from the frame 19. This socket 21 is preferably square or out of round in cross section and can either be formed as a separate member attached to the frame 19 by rivets 22 or it can be formed integrally with the frame.

The shield is supported by a tubular supporting and guiding member 23 which is provided with a longitudinal slot 24 on one side. At its upper end this tubular supporting member 23 is provided with a head 25 which is fitted in the tube and is secured to the ear 26 of a bracket 27 by a pivot bolt 28. The bracket 27 is provided with a pair of holes which are adapted to receive bolts 29, these bolts 29 securing the bracket 27 to the windshield frame 12, the head bar 13 or the windshield post 11 as the particular construction of the automobile to which it is applied may require. The anti-glare shield 17 is adapted to be arranged close to and parallel with the automobile windshield 10 and it will therefore be apparent that the provision of the pivot bolt 28 between the supporting tube 23 and the bracket 27 permits the anti-glare shield 17 to be swung upwardly and enable the convenient cleaning of the inner face of the windshield 10.

Within the tubular supporting and guiding member 23 is slidingly fitted a block 30 and into this block 30 is screwed a screw 31 having an enlarged shank 32 and a still larger square head 34. The diameter of the shank 32 is substantially the same as the width of the slot 24, this shank riding in and being guided by this slot and the head 34 projecting outwardly from the tubular supporting and guiding member 23. The square head 34 of this screw 31 is removably fitted into the socket 21 of the anti-glare shield frame 19 and these parts are held together by a screw 35 having a winged head 36, as best shown in Fig. 5.

At the lower end of the tubular supporting and guiding member 23 a head or collar 37 is fitted into the same and through the front and rear sides of the tube 23 and head 27 a pair of holes 38 and 39 are drilled. The head 37 is provided with a vertical central passage which receives the upper end of a flexible cable 40. The head 37 and flexible cable 40 are held in place by a set screw 41 which passes through the rear threaded opening 38 in the lower end of the tube 23 and head 37 and is screwed into the adjacent side of the cable 40.

The anti-glare shield is yieldingly held in an elevated position by a helical compression spring 42 which is arranged in the slotted tube 23 and is interposed between the sliding block 30 and the head 37. To move the anti-glare shield downwardly into the dotted line position indicated in Fig. 1 or into any intermediate position a wire 43 is provided, this wire being secured to the sliding block 30 and being housed in a flexible cable 40 so that upon drawing this wire downwardly the sliding block 30 and anti-glare shield 17 will be moved against the resistance of the spring 42 into a lowered position. To fasten the wire 43 to the sliding block 30 a screw 44 is provided, this screw having a central passage through which the wire 43 extends. The wire 43 is threaded into the opening in the screw 44 and its upper end is bent over as indicated at 45. The screw 44 is then screwed into a threaded hole in the under side of the sliding block 30 and the bent end 45 is firmly pressed against the block 30 so as to insure a reliable connection between this sliding block and the wire 43.

The anti-glare shield is secured to the square head 34 of the screw 31 adjacent its upper end and in order to support the shield at its lower end a sliding spring connection is provided between the lower end of the anti-glare shield frame 19 and the surrounding tube 23. As best shown in Fig. 2 this comprises a leaf spring 47 which is secured to the anti-glare shield frame 19 by a bolt 48 or in any other suitable manner and the free end of this leaf spring 47 is bent outwardly and bears against the adjacent side of the tubular supporting member 23. By this means the lower end of the anti-glare shield is flexibly supported and at the same time the spring 47 rides freely along the tube 23 so as not to interfere with the free vertical movement of the anti-glare shield.

In order to prevent contact between the frame 19 of the anti-glare shield and the windshield with possible injury to both, buffer means are provided. For this purpose the front threaded opening 39 at the lower end of the tubular member 23 receives the stem of a screw 50 having a rubber head 51. The rubber head 51 is arranged to contact with the adjacent part of the windshield frame 12 or other part to which the anti-glare shield is applied and thereby limit the movement of the anti-glare shield toward the windshield. In order to prevent whipping of the anti-glare shield into contact with the windshield a similar buffer 52 is provided in a threaded opening 53 extending through the upper outer corner of the anti-glare shield frame 19. This directly prevents contact between the frame 19 and the windshield 10.

It will be noted that the above construction permits of mounting the anti-glare shield either on the left hand or the right hand sides of the car. As shown it is mounted at the left hand side of the car but should it be desired to mount the shield on the other side, the bracket 27 and pivot bolt 28 are reversed so as to be arranged on the opposite side of the tubular supporting and guiding member 23, the said screw 41 is screwed into the threaded opening 39, the buffer and screws 51, 50 are screwed into the opposite threaded opening 38, and the buffer 52 is screwed in from the opposite side of the threaded opening 53. With these changes the device can be secured to the right hand side of a windshield frame head bar or windshield post, this reversal thereby requiring no special parts to be supplied.

The opposite end of the flexible cable 40 is screwed into the end of a sleeve 55 by a set screw 56. The opposite end of the sleeve 55 is threaded and carries a nut 57 and a nut 58. The part to which the sleeve 55 is secured is received between these nuts 57 and 58. As shown this part consists of an ear 59 formed one one section of a clamping ring 60, the sections of this clamping ring being shown as hinged at one side and held to the steering post 15 of the automobile by a bolt 61 at its opposite side. It is apparent, however, that an opening (not shown) can be provided in the dash board 14 of the automobile and that the sleeve can be passed through this opening and held therein by the engagement of the nuts 57 and 58 with the opposite sides of the dash board. Within the sleeve 55 is slidingly secured a plunger 62 having a plurality of ratchet teeth 63 at one side. At its opposite side this plunger 62 is provided with a V-groove 64 which receives the pointed end of a screw 65. This screw 65 permits longitudinal movement of the plunger 62 but prevents turning movement thereof. At its inner end this plunger is formed to provide an eye 66 to which the corresponding end of the wire 43 is secured.

The nut 58 is extended upwardly to form a hollow head 67 and within this head a dog 68 is pivotally mounted. This dog is arranged to engage the ratchet teeth 63 of the plunger and is moved out of engagement with these teeth by a thumb piece 69 which is formed integrally with the dog 68. The dog 68 is yieldingly held in engagement with the teeth 63 of the plunger by a small spring 70 interposed between the nut 58 and the under side of the thumb piece 69. The plunger is actuated by an exterior knob 71 at its outer end and the nut 58 is held against turning relatively to the plunger 62 by a V-shaped projection 72 which engages the V-shaped notch 69 in the plunger.

From the foregoing it is apparent that when the operator wishes to lower the anti-glare shield 17 to cut out the glare of approaching headlights or the like he merely grasps the knob 71 and pulls upon the same until the anti-glare shield is lowered to the desired position. This pulling on the knob 71 draws the plunger 62 outwardly thereby drawing the wire 43 and sliding block 30 in a corresponding direction and lowering the anti-glare shield 17 against the resistance of the spring 42. When the anti-glare shield 17 is in this lowered position it is prevented from being returned by the spring 42 through the engagement of the dog 68 with the ratchet teeth 63 in the plunger 62. When the driver wishes to elevate the anti-glare shield 17 he presses upon the thumb piece 69 which releases the dog 68 from the ratchet teeth 63 of the plunger 62. This permits the return spring 42 to move the sliding block 30 and the anti-glare shield 17 upwardly and when the shield is moved to the desired elevated position the driver releases the thumb piece 69 which permits the spring 70 to return the dog 68 into engagement with the ratchet teeth 63 and prevent further upward movement of the anti-glare shield.

It will be noted from the foregoing description that the present invention provides an anti-glare shield which can be quickly and conveniently moved to any desired position to cut out the glaring light, the same is extremely simple and inexpensive to construct and install and contains few parts which are not liable to get out of order even under the severe vibration to which accessories of this type are subjected. The anti-glare shield assembly is also readily reversible for use at either the left or right sides of the car, it can be conveniently swung away from the windshield in cleaning it and adequate provision is made to insure against contact between the anti-glare shield and the automobile windshield. The anti-glare shield is also neat in appearance and forms an attractive adjunct to the automobile equipment.

I claim as my invention:

1. A device of the character described, comprising a shield, means for supporting and guiding said shield for substantially parallel movement relative to a windshield or the like, a helical spring arranged parallel to the movement of said shield and carried and supported against lateral displacement solely by said supporting means and interposed between said supporting means and shield to yieldingly hold said shield in one extremity of its guided movement and means for adjustably moving and holding said shield against the resistance of said spring to at least two positions.

2. A device of the character described, comprising a supporting member having a substantially straight vertical guideway means for mounting said member adjacent a windshield or the like, a guided member movable along said guideway, a shield arranged in a vertical plane and connected at its upper end to said guided member, a leaf spring remote from the connection between said shield and guided member interposed between the lower end of said shield and said supporting member and secured to one and slidable along the other whereby the lower end of said shield is yieldingly supported and means for adjustably moving said guided member to any desired adjusted position.

3. A device of the character described, comprising a tube provided with a longitudinal slot, a head at at least one end of said tube, means for mounting said tube adjacent a windshield or the like, a guide block arranged in said tube and movable longitudinally therein, a shield arranged outside of said tube and connected to said block through said slot, a helical spring arranged in said tube and interposed between said head and block and yieldingly tending to hold said block in one extreme position, and means for adjustably moving said block to any desired adjusted position along said tube.

4. A device of the character described, comprising a tube provided with a longitudinal slot, means for mounting said tube adjacent a windshield or the like, a guide block arranged in said tube and movable longitudinally therein, a stem in said block said stem being provided with a shank and an out of round head projecting outwardly through said slot, a shield having an out of round socket receiving said screw head, means for removably securing said socket and head and means for adjustably moving said block to any desired position along said tube.

5. A device of the character described, comprising a tube provided with a longitudinal slot, means for mounting said tube adjacent a windshield or the like, a head arranged at one end of said tube, a compression spring interposed between said head and block, a shield arranged outside of said tube and connected to said block through said slot and means for adjustably moving and holding said shield against the resistance of said spring in any desired position.

6. A device of the character described, comprising a tube provided with a longitudinal slot, means for mounting said tube adjacent a windshield or the like, a block slidingly arranged in said tube, a shield arranged outside of said tube and connected to said block through said slot and means for moving said block to any desired position along said tube, comprising a wire arranged longitudinally in said tube and projecting outwardly from one end thereof, means remote from said tube for shifting said wire longitudinally and means for securing said wire to said block comprising a screw having an opening extending therethrough and screwed into the lower end of said block, the end of said wire passing through the opening in said screw and being bent over to be held between the inner end of said screw and said block.

7. A device of the character described, comprising a tube provided with a longitudinal slot, means for mounting said tube adjacent a windshield or the like, a block slidingly arranged in said tube, a shield arranged outside of said tube and connected to said block through said slot and means for moving said block to any desired position along said tube, comprising a head arranged at one end of said tube and having an opening therethrough, a flexible cable having one end fitted in said opening, a set screw extending transversely through said tube and head and bearing against said cable, a wire housed in said cable and having one end connected to said block and means at the opposite end of said cable for moving said wire to move said block and shield along said tube.

In testimony whereof I hereby affix my signature.

AMICO MICHAEL PURCHIO.